United States Patent
Stephan et al.

(10) Patent No.: US 11,822,330 B2
(45) Date of Patent: Nov. 21, 2023

(54) METHOD FOR OPERATING AN AIRCRAFT, FLIGHT CONTROL SYSTEM FOR AN AIRCRAFT AND AIRCRAFT WITH SUCH A FLIGHT CONTROL SYSTEM

(71) Applicant: Volocopter GmbH, Bruchsal (DE)

(72) Inventors: Johannes Stephan, Stuttgart (DE); Jan Zwiener, Waldbronn (DE)

(73) Assignee: Volocopter GmbH, Bruchsal (DE)

( * ) Notice: Subject to any disclaimer, the term of this patent is extended or adjusted under 35 U.S.C. 154(b) by 226 days.

(21) Appl. No.: 17/244,090

(22) Filed: Apr. 29, 2021

(65) Prior Publication Data
US 2021/0341916 A1  Nov. 4, 2021

(30) Foreign Application Priority Data

Apr. 30, 2020 (DE) .................... 102020111810.4

(51) Int. Cl.
*G05D 1/00* (2006.01)
*B64D 31/04* (2006.01)
(Continued)

(52) U.S. Cl.
CPC .......... *G05D 1/0055* (2013.01); *B64D 27/24* (2013.01); *B64D 31/04* (2013.01); *B64D 31/14* (2013.01)

(58) Field of Classification Search
CPC .... G05D 1/0055; G05D 1/0077; G05D 1/101; B64D 27/24; B64D 31/04; B64D 31/14; B64D 31/06; Y02T 50/60; B64C 27/08
(Continued)

(56) References Cited

U.S. PATENT DOCUMENTS

| | | | |
|---|---|---|---|
| 8,600,583 B2 * | 12/2013 | Fervel | B64C 13/503 701/16 |
| 9,168,995 B2 * | 10/2015 | Brot | G05D 1/0077 |

(Continued)

FOREIGN PATENT DOCUMENTS

| | | |
|---|---|---|
| EP | 3170746 | 11/2015 |
| WO | 2012035025 | 3/2012 |
| WO | 2019209629 | 10/2019 |

OTHER PUBLICATIONS

Zhu, Jianxin et al., "Design and Implementation of Ground Station Software for a Certain Type of Unmanned Aircraft", Journal of Central South Forestry University of Science and Technology, No. 4, Apr. 15, 2011.

(Continued)

*Primary Examiner* — Muhammad Shafi
(74) *Attorney, Agent, or Firm* — Volpe Koenig

(57) ABSTRACT

A method for operating an aircraft with N>4 drive units. A flight control system (FCS) generates control commands u_COM, u_COM∈⟦ U∈R ⟧ ^N, for the drive units, via a first channel. u represents limitations of the drive units. The FCS generates pseudo-control commands γ_COM, γ_COM∈R^4, in the first channel, which specify torques about corresponding axes of rotation of the aircraft and a thrust, a control matrix M∈R^(4×N) with γ=M u establishing a relationship with the control commands u; in the first channel. Admissible control commands u_COM∈U are calculated from the pseudo-control commands; and the first channel is monitored and, based on a result, is passivated. Monitoring takes place in a second channel, pseudo-control commands γ_MON, γ_MON∈R^4, are generated in the second channel and the control commands u_COM of the first channel are evaluated in the second channel using γ^*=M u_COM, and (Continued)

$\gamma\hat{}*$ and $\gamma\_MON$ are compared. A FCS and aircraft are also provided.

20 Claims, 1 Drawing Sheet

(51) Int. Cl.
    *B64D 27/24*     (2006.01)
    *B64D 31/14*     (2006.01)

(58) Field of Classification Search
    USPC .............................................................. 701/3
    See application file for complete search history.

(56) References Cited

U.S. PATENT DOCUMENTS

| | | | |
|---|---|---|---|
| 2011/0276199 A1* | 11/2011 | Brot | G05D 1/0077 701/3 |
| 2012/0029738 A1 | 2/2012 | Brunetti et al. | |
| 2014/0100718 A1 | 4/2014 | Brot et al. | |
| 2015/0353192 A1* | 12/2015 | Morrison | B64D 31/06 244/17.23 |
| 2016/0059958 A1* | 3/2016 | Kvitnevskiy | B64C 27/08 244/17.23 |
| 2016/0147224 A1 | 5/2016 | Roger et al. | |
| 2017/0152033 A1* | 6/2017 | Allen | B64C 27/57 |
| 2018/0257762 A1 | 9/2018 | Colonna et al. | |
| 2018/0290730 A1* | 10/2018 | Brot | B64C 13/18 |
| 2019/0391598 A1* | 12/2019 | Murakoshi | B64C 13/20 |
| 2020/0103922 A1* | 4/2020 | Nonami | G06F 17/16 |

OTHER PUBLICATIONS

Sima, Jun, "Failure Detection and Fault Tolerance Technology of Civil Aircraft Teletype Flight Control System", Civil Aircraft Design and Research, No. 3, Sep. 30, 2018.

Wang, Heng, "Fault Detection Method of Linear System based on LMI technique", Chinese Excellent Doctoral Dissertation Electronic Library of Information Technology Series, Jun. 15, 2011.

Gheorghe, Anca et al., "Model-Based Approaches for Fast and Robust Fault Detection in an Aircraft Control Surface Servo Loop: From Theory to Flight Tests" [Applications of Control], IEEE Control Systems Magazine, May 15, 2013.

* cited by examiner

METHOD FOR OPERATING AN AIRCRAFT, FLIGHT CONTROL SYSTEM FOR AN AIRCRAFT AND AIRCRAFT WITH SUCH A FLIGHT CONTROL SYSTEM

INCORPORATION BY REFERENCE

The following documents are incorporated herein by reference as if fully set forth: German Patent Application No. 10 2020 111 810.4, filed Apr. 30, 2020.

TECHNICAL FIELD

The invention relates to a method for operating an aircraft with N, N>4, drive units, preferably in the form of electrically driven rotors, in which a flight control system generates control commands $u_{COM}$, $u_{COM} \in U \subset R^N$, for the drive units, via a first channel, where U represents (technical or physical) limitations of the drive units, and transmits them to the drive units; the flight control system also generates pseudo-control commands $\gamma_{COM}$, $\gamma_{COM} \subset R^4$, in the first channel, which pseudo-control commands specify torques about corresponding axes of rotation of the aircraft and a thrust, which torques and which thrust are generated by the drive units, a control matrix $M \in R^{4 \times N}$ according to $\gamma = M u$ establishing a relationship with the control commands u; in the first channel, admissible control commands $u_{COM} \in U$ are calculated from the pseudo-control commands $\gamma_{COM}$ by an allocation algorithm; and the first channel is monitored by an independent second channel and, in dependence on a monitoring result, is passivated.

The invention also relates to a flight control system for an aircraft with N, N>4, drive units, preferably in the form of electrically driven rotors, with: a first channel, which is configured for generating control commands $u_{COM}$, $u_{COM} \in U \subset R^N$, for the drive units, where U represents (technical or physical) limitations of the drive units, and for transmitting the control commands to the drive units; a second channel, which is independent of the first channel and is operatively connected to the first channel for monitoring the first channel and for delivering a monitoring result; and a passivation means, which is configured for passivating the first channel in dependence on the monitoring result; in which the first channels is also configured to generate pseudo-control commands $\gamma_{COM}$, $\gamma_{COM} \in R^4$, which pseudo-control commands specify torques about corresponding axes of rotation of the aircraft and a thrust, which torques and which thrust can be generated by the drive units, a control matrix $M \in R^{4 \times N}$ according to $\gamma = M u$ establishing a relationship with the control commands u and admissible control commands $u_{COM} \in U$ being calculated from the pseudo-control commands $\gamma_{COM}$ by an allocation algorithm.

The invention also relates to an aircraft with N, N>4, drive units, preferably in the form of electrically driven rotors, and with a flight control system according to the invention, preferably in operative connection with input means for pilot inputs and/or with sensor means for delivering (sensor) measurement results for the generation of the pseudo-control commands $\gamma_{COM}$.

BACKGROUND

When operating an aircraft, in particular of the type mentioned above, this is a safety-critical application, which must be ensured to be fault-free. A sufficiently well-known approach for ensuring freedom from faults of a control system in safety-critical applications at the time of operation, i.e. in addition to a design assurance, is the use of a so-called COM/MON architecture. Such an architecture has a two-channel configuration, the mentioned first channel representing the command or COM channel, which correspondingly is given the actual control task, while the second channel (monitor or MON channel) monitors, and if appropriate passivates, the COM channel, which can take place by way of a switch arranged at the output of the COM channel. A typical application of such an architecture is for example the flight control in commercial aviation.

The second channel (MON channel) is generally an exact functional copy of the COM channel (first channel), as is known for example from US 2011/0276199 A1, US 2008/0290730 A1, U.S. Pat. No. 9,168,995 B2 or CN 101993922O A. In this way, in the case of a deviation between control commands that have been generated in the COM channel and control commands that have been generated in the MON channel, a fault (in the COM channel) can be established directly. In the case of execution by software, this must be performed differently (dissimilarly) for the two channels mentioned, in order to exclude the possibility of common implementation faults.

For high-redundancy applications, for example payload- and/or people-carrying multicopters, that is to say aircraft with a multiplicity of drive units, in particular more than four drive units, the control system must divide the applicable control demand among the individual drive units (also: actuators). The so-called allocation task is algorithmically complex, since a limited optimization problem must be solved. Execution of the conventional COM/MON approach is in this case very complex, since, for proper functioning, two independent implementations of a so-called allocator that is present in the control system are required. Typically, the mentioned allocation task is assigned to those parts of flight control software that have the highest cyclomatic complexity. Admissible control commands $u_{COM} \in UR$ are in this case regularly calculated by an allocation algorithm from the pseudo-control commands $\gamma_{COM}$, which can generally be presented as an optimization problem:

$$u_{COM} = \text{argmin}(J(u)) \text{ s. t.,}$$

$$\gamma = M u_{COM},$$

$$u \in U,$$

where J(u) represents a target cost functional that is used for minimizing the control demand. The conversion of $\gamma$ into admissible control commands $u_{COM} \in U$ (that is to say the allocation) is accordingly relatively complex and resource-intensive. Since M is not a square matrix, no conventional inverse exists to calculate $u_{COM}$ directly from the pseudo-control commands $\gamma_{COM}$. It is true that in principle a so-called pseudo-inverse can be used. However, it cannot in this way be ensured that the calculated motor commands are also "feasible" (i.e. can be executed)—that is to say for example, in the case of a rotor aircraft, the RPM (rotational speed) limits for the rotors are observed.

SUMMARY

The invention is based on the object of providing a method for operating an aircraft of the type defined further above and a flight control system for an aircraft of the type defined further above and also such an aircraft itself which helps in ensuring freedom from faults of the described approach, without disadvantageously having excessive algorithmic complexity. As a result, effort and costs should be reduced and fail safety increased.

The object is achieved by a method for operating an aircraft with one or more of the features disclosed herein, by a flight control system for an aircraft with one or more of the features disclosed herein, and by an aircraft with one or more of the features disclosed herein. Advantageous developments of the idea according to the invention are defined below and in the claims.

The approach according to the invention described below allows considerable effort to be saved in the specification, implementation and verification of in particular the software parts mentioned. This also applies in particular in the context of a certification of the flight control system, which certification represents a decisive prerequisite for its practical use. Moreover, the independence between COM (first channel) and MON (second channel) is advantageously increased.

A method according to the invention for operating an aircraft with N, N>4, drive units, preferably in the form of electrically driven rotors, in which a flight control system generates control commands $u_{COM}$, $u_{COM} \in U \subset R^N$, for the drive units, via a first channel, where U represents limitations of the drive units, and transmits them to the drive units; the flight control system also generates pseudo-control commands $\gamma_{COM}$, $\gamma_{COM} \in R^4$, in the first channel, which pseudo-control commands specify torques about corresponding axes of rotation of the aircraft and a thrust, which torques and which thrust are generated by the drive units, a control matrix $M \in R^{4 \times N}$ according to $\gamma = M u$ establishing a relationship with the control commands u; in the first channel, admissible control commands $u_{COM} \in U$ are calculated from the pseudo-control commands $\gamma_{COM}$ by an allocation algorithm; and the first channel is monitored by an independent second channel and, in dependence on a monitoring result, is passivated, is a method wherein the monitoring of the first channel takes place in the second channel, in that pseudo-control commands $\gamma_{MON}$, $\gamma_{MON} \in R^4$, are likewise generated in the second channel and the control commands $u_{COM}$ of the first channel are evaluated in the second channel by the relationship $\gamma^* = M u_{COM}$, for which $\gamma^*$ and $\gamma_{MON}$ are compared with one another to generate the monitoring result.

A flight control system according to the invention for an aircraft with N, N>4, drive units, preferably in the form of electrically driven rotors, with: a first channel, which is configured for generating control commands $u_{COM}$, $u_{COM} \in U \subset R^N$, for the drive units, where U represents limitations of the drive units, and for transmitting the control commands to the drive units; a second channel, which is independent of the first channel and is operatively connected to the first channel for monitoring the first channel and for delivering a monitoring result; and a passivation means, which is configured for passivating the first channel in dependence on the monitoring result; in which the first channel is also configured to generate pseudo-control commands $\gamma_{COM}$, $\gamma_{COM} \in R^4$, which pseudo-control commands specify torques about corresponding axes of rotation of the aircraft and a thrust, which torques and which thrust can be generated by the drive units, a control matrix $M \in R^{4 \times N}$ according to $\gamma = M u$ establishing a relationship with the control commands u and admissible control commands $u_{COM} \in U$ being calculated or determinable from the pseudo-control commands $\gamma_{COM}$ by an allocation algorithm; is a system wherein the second channel is set up for monitoring the first channel, in that the second channel is configured for generating pseudo-control commands $\gamma_{MON}$, $\gamma_{MON} \in R^4$, and for evaluating the control commands $u_{COM}$ of the first channel by the relationship $\gamma^* = M u_{COM}$ by a comparison of $\gamma^*$ and $\gamma_{MON}$ to generate the monitoring result.

An aircraft according to the invention with N, N>4, drive units, preferably in the form of electrically driven rotors, comprises a flight control system according to the invention, preferably in operative connection with input means for pilot inputs and/or with sensors for delivering (sensor) measurement results for the generation of the pseudo-control commands $\gamma_{COM}$.

The proposed method or flight control system has in a way known per se a COM/MON configuration, but manages here with just one implementation of the allocator, which allocator ascertains the control commands for the individual drive units from the pseudo-control commands by the allocation algorithm. In order nevertheless to ensure the correctness of the calculations in the first channel, the second channel has a so-called deallocator, which has a much lower algorithmic complexity than the allocator of the first channel. This is so because, in comparison with the allocation calculation explained above, the calculation in the other direction ($\gamma^* = M u_{COM}$) has a much lower complexity, which is accompanied by reduced demands on the resources used.

According to the invention, the mentioned deallocator is defined by way of the relationship $\gamma^* = M u_{COM}$, and can therefore be of a much simpler design than the allocator in the first channel (allocation algorithm). It can subsequently be ensured by a simple comparison of $\gamma^*$ and $\gamma_{MON}$ that or whether the first channel (COM channel) is operating fault-free or that/whether its outputs coincide with the calculations of the second channel (MON channel).

Within the scope of a first development of the method according to the invention, it may be provided that the first channel is passivated (that is to say at least temporarily switched off) if the comparison of $\gamma^*$ and $\gamma_{MON}$ finds a deviation, which preferably lies outside a prescribed limit value for this deviation. In this way, the (faulty) COM channel can be switched off if such a fault is detected.

Within the scope of another development of the method according to the invention, it may be provided that the passivation is performed by actuating a suitable switching means for the first channel. This may involve using the monitoring result itself or a corresponding signal, derived from the monitoring result, for actuating the switching means—either directly or after prior further processing, which will be discussed in further detail.

It is advantageously provided that, in the case of a corresponding development of the method according to the invention, in the first channel the pseudo-control commands $\gamma_{COM}$ are determined on the basis of pilot inputs and/or measurement results of sensor measurements. For this purpose, the aerial device to be operated may have corresponding sensor means (and/or input means for pilot inputs).

It is advantageously provided that, in a development of the method according to the invention, in the first channel the pseudo-control commands $\gamma_{COM}$ are generated by a first (software) implementation of open-loop/closed-loop control laws for the aircraft. Such open-loop/closed-loop control laws take into account a (physical) actual state of the aircraft and a set state, derived in particular from the mentioned pilot inputs. On the basis of such defaults and other modelled physical influences on the movement of the aircraft, the mentioned pseudo-control commands are determined, which pseudo-control commands indicate torques about corresponding axes of rotation (longitudinal axes, transverse axis and vertical axis) of the aircraft and also a thrust. The mentioned torques and the thrust are generated by the drive units of the aircraft.

In the case of a corresponding development of the method according to the invention, it is advantageously provided that the control matrix $M \in R^{4 \times N}$ according to $\gamma = M u$ establishes a linear relationship with the control commands u. The use of such a linear relationship has proven to be particularly advantageous in practice. In particular, it can be easily implemented.

In the course of a most advantageous development of the method according to the invention, it may be provided that in the second channel the pseudo-control commands $\gamma_{COM}$ are generated by a second implementation of (the mentioned) open-loop/closed-loop control laws. On account of the fact that the pseudo-control commands are respectively generated with preferably different implementations (corresponding algorithmics and/or a specifically software-based form of execution) in the first channel and in the second channel, that is to say the first implementation and the second implementation being different, the intended monitoring function can be advantageously executed.

A corresponding first development of the flight control system according to the invention provides that it is configured for carrying out a method according to the invention in which preferably the first channel is configured for generating the pseudo-control commands $\gamma_{COM}$ by a first implementation of open-loop/closed-loop control laws and in which also preferably the second channel is configured for generating the pseudo-control commands $\gamma_{COM}$ by a second implementation of open-loop/closed-loop control laws, the first implementation most preferably being different from the second implementation.

Yet another development of the method according to the invention provides that, in addition to the comparison referred to, a feasibility check also takes place. The second channel checks the reliability of the control commands calculated by the first channel in accordance with $u_{COM} \in U$, that is to say whether the first channel observes the limitations of the drive units and the associated motors can consequently execute the control commands. Combined with the first check, compliance with both secondary conditions of the allocation calculation ($u_{COM} \in U$ and $\gamma^* = M u_{COM}$) is therefore ensured, and the implementation of the control law and the allocator on the first channel can be considered to be valid by the second channel. Altogether, the second channel can consequently monitor the first channel without having to carry out the complex optimization referred to for the allocation.

In the course of a development of this idea, it has proven to be advantageous if a result of the feasibility check and the monitoring result are combined before a passivation of the first channel, in order to increase the monitoring certainty and rule out mistaken switch-offs. Such a combination may be performed by using logical operators, most preferably by using an AND function (logical AND gate).

In the case of a corresponding development of the flight control system according to the invention, it may therefore be provided that it is additionally configured to subject its output data to a feasibility check, and for this purpose has a combination means for combining a result of the feasibility check and the monitoring result before a passivation of the first channel, preferably a logical combination means, most preferably an AND gate. A passivation of the first channel consequently preferably only takes place whenever an output signal of the combination means, which combination means is preferably operatively connected directly to the switching/passivation means, has corresponding properties.

In yet another development of the flight control system according to the invention, it may be provided that the passivation means is configured as switching means, which has already been referred to further above.

A special scenario for implementation of the present invention concerns a manned multicopter, which is controlled by a flight control system according to the invention. In order to meet the high safety requirements for such aircraft, the flight control system has at least two independent channels, specifically the first channel (COM channel) and the second channel (MON channel). The COM channel preferably generates from the pilot inputs and sensor measurements corresponding control commands for the electrical drives of the multicopter. Each COM channel is in this case monitored by an independent MON channel, and if appropriate passivated. The present invention is therefore not restricted in any way to the presence of just one first channel and just one second channel.

The number of drives specifically of a manned multicopter is set on a redundant basis because of the high safety requirements, which means that there are more than four drives or drive units. It has already been explained in detail that the mentioned pseudo-control commands designate the three torques and the thrust that is/are generated—for example as specified by a human or automatic pilot—by the drive units or actuators. The control matrix indicated further above establishes a preferably linear relationship between the pseudo-control commands and the actual control commands. The control commands may also be referred to as motor commands, since they are transmitted directly to the motors present in the drive units (in particular for driving corresponding rotors).

As already mentioned, the COM channel has an open-loop/closed-loop control law, which can calculate on the basis of pilot inputs and sensor measurements a control demand, that is to say the corresponding pseudo-control commands. A so-called (control) allocator present in the COM channel calculates from this the actual motor commands and correspondingly distributes the control demand among the drive units. This step is algorithmically complex and numerically complex, because it involves a limited optimization problem.

Within the scope of the invention, it is provided according to the above statements that the second channel (MON channel) manages without such a control allocator. As a result, the implementation effort and the demand for the computing power of the MON channel are significantly reduced. The mentioned implementation effort would arise in particular as a result of the fact that the implementation of the control allocator in the second channel must be different from the implementation of the control allocator in the first channel. Advantageously, the COM channel and the MON channel have a synchronized input interface, and consequently receive identical pilot inputs and sensor measurements at each point in time. The COM channel transmits the motor commands calculated by it not only to the drive units but also to the MON channel. With a corresponding configuration, the MON channel has its own independent implementation of the open-loop/closed-loop control law, and consequently calculates the control demand independently. In the fault-free case, the control demand respectively ascertained by the two channels should be the same.

As already mentioned, the MON channel uses instead of a control allocator a so-called deallocator, which is mathematically merely a linear transformation. The deallocator uses the motor commands calculated by the COM channel and for this applies the mentioned control matrix to calculate corresponding pseudo-control commands. These are compared with those pseudo-control commands that the MON channel had ascertained itself on the basis of its open-loop/closed-loop control law and made available to the second channel. Only if the comparison of these two pseudo-control commands finds that there is a deviation can or will the COM channel be passivated, for example by opening a corresponding switch.

BRIEF DESCRIPTION OF THE DRAWINGS

Further properties and advantages of the invention become apparent from the following description of exemplary embodiments with reference to the drawings. In the drawings.

DETAILED DESCRIPTION

Figure 1:
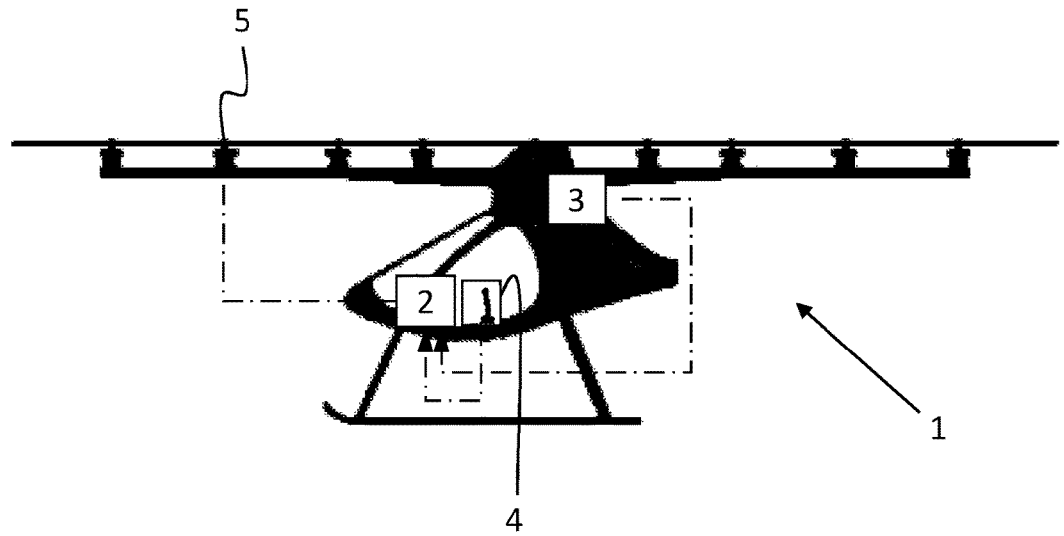
FIG. 1 shows an aircraft according to the invention.

In FIG. 1, an aircraft in the form of a person-carrying multicopter with a plurality of drive units is schematically shown at reference sign 1. It is in particular an aircraft known per se produced by the applicant, which has 18 drive units (rotors with corresponding drive motors). However, the invention is not in any way restricted to such an aircraft. For example, the aircraft may have in addition to the lift rotors shown also so-called pushers (for acceleration in the forward direction). The exact technical configuration of the drive units used is also at least not of any essential significance within the scope of the invention.

The aircraft 1 has at reference sign 2 a computer-based flight control system, which is discussed in still more detail further below. Reference sign 3 denotes sensors, which deliver corresponding measurement results or sensor (measurement) results that describe an (actual) state of the aircraft 1. The sensors 3 are in signaling operative connection with the flight control system 2, as shown. Reference sign 4 denotes input means for pilot inputs, for example a joystick or control stick. These input means 4 are likewise in signaling operative connection with the flight control system 2, as shown.

Using the mentioned measurement results or pilot inputs, the flight control system 2 calculates control commands or motor commands for the individual drive units, of which only one is explicitly denoted in FIG. 1 by reference sign 5. The drive units 5 subsequently generate torques and thrust, in particular in accordance with the pilot inputs, in order that the aircraft 1 can be operated (flown) in a desired way.

Figure 2:
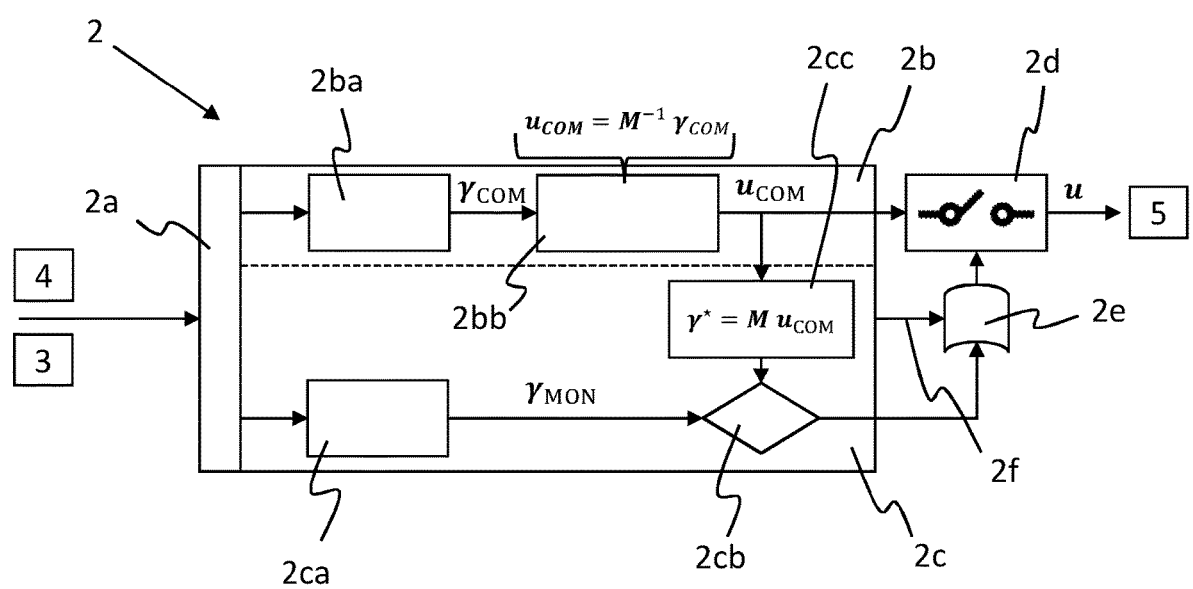
FIG. 2 shows a flight control system according to the invention and a flow diagram of a method according to the invention.

FIG. 2 then shows more specifically a possible configuration of the flight control system 2, as it may be contained in the aircraft 1 according to FIG. 1.

Reference sign $2a$ denotes a synchronized input interface, via which the flight control system 2 receives the pilot inputs or the results of the sensor measurements (cf. FIG. 1). This is correspondingly symbolized in FIG. 2 by corresponding indication of the reference signs 3 and 4. Extending from the input interface $2a$, the flight control system 2 has two separate, independent channels, which is symbolized in FIG. 2 by a dashed line, which separates the two channels. The channel depicted at the top in FIG. 2 is the first channel or COM channel $2b$. The channel depicted at the bottom in FIG. 2 is the second channel or MON channel $2c$. In the first channel $2b$, a first implementation of the open-loop/closed-loop control law explained in detail further above is provided at reference sign $2ba$, in particular in the form of a software-based implementation on a suitable computer. The COM channel $2b$ thereby calculates the control demand $\gamma_{COM}$ and passes on these so-called pseudo-control commands to a control allocator $2bb$ present in the first channel $2b$. This control allocator calculates the actual control commands or motor commands $u_{COM}$ by the formulaic relationship indicated in FIG. 2. These control commands $u_{COM}$ are passed on via a switch $2d$—as long as it is closed—as the actual control commands u to the drive units 5.

The second channel or MON channel $2c$ of the flight control system 2 likewise has at reference sign $2ca$ an implementation of the open-loop/closed-loop control law, the implementation at reference sign $2ca$ being different however from the implementation at reference sign $2ba$. The second channel $2c$ for its part thereby independently determines the control demand $\gamma_{MON}$ from the inputs at reference sign $2a$ and passes this on to a comparator or comparison step at reference sign $2cb$. This comparator or comparison step $2cb$ also receives the output of a so-called deallocator, which is contained in the second channel $2c$ and is denoted at reference sign $2cc$. The deallocator $2cc$ determines by the formulaic relationship indicated in FIG. 2 a control demand $\gamma^*$ while taking into account the motor commands $u_{COM}$ of the first channel $2b$. The comparator at reference sign $2cb$ is configured to compare the control demand $\gamma_{MON}$ and the control demand $\gamma^*$ and to output a corresponding comparison result or a (control) signal derived from it. This comparison result or signal is applied by a logical AND gate $2e$ to the switch $2d$ in order to actuate the latter as and when required. The logical gate $2e$ is an optional component: the result of the comparison at reference sign $2cb$ may also be applied to the switch $2d$ directly.

It is provided in the present case that the switch $2d$ is opened, that is to say that the first channel $2b$ is passivated or (temporarily) switched off, if the result of the comparison at reference sign $2cb$ finds that there is a (an excessive) deviation between $\gamma_{MON}$ and $\gamma^*$. This may indicate faulty behavior of the first channel $2b$.

According to the configuration in FIG. 2, the (optional) logical gate $2e$ receives at reference sign $2f$ a further input signal. This is a feasibility check of the motor commands calculated by the COM channel by the MON channel according to $u_{COM} \in U$. In the present case, therefore, the switch $2d$ is for example only closed whenever the logical operation at reference sign $2e$ indicates that both the comparison at reference sign $2cb$ has a positive result (no deviation) and also the signal at reference sign $2f$ indicates that the motor commands calculated by the COM channel according to $u_{COM} \in U$ can be executed by the motors.

The invention claimed is:

1. A method for operating an aircraft with N drive units, where N is greater than 4, the method comprising:

a flight control system generating control commands $u_{COM}$, $u_{COM} \in U \subset R^N$, for the drive units, via a first channel, where U represents limitations of the drive units, and transmitting the control commands to the drive units;

the flight control system also generating pseudo-control commands $\gamma_{COM}$, $\gamma_{COM} \in R^4$, in the first channel, said pseudo-control commands specifying torques about corresponding axes of rotation of the aircraft and a thrust, said torques and said thrust being generated by the drive units, a control matrix $M \in R^{4 \times N}$ according to $\gamma = M\, u$ establishing a relationship with the control commands u;

in the first channel, calculating admissible control commands $u_{COM} \in U$ from the pseudo-control commands $\gamma_{COM}$ by an allocation algorithm;

monitoring the first channel by an independent second channel and, in dependence on a monitoring result, passivating the first channel;

the monitoring of the first channel taking place in the second channel, by likewise generating pseudo-control commands $\gamma_{MON}$, $\gamma_{MON} \in R^4$ in the second channel and evaluating the control commands $u_{COM}$ of the first channel in the second channel by a relationship $\gamma^* = M\, u_{COM}$, for which $\gamma^*$ and $\gamma_{MON}$ are compared with one another for generating a monitoring result.

2. The method as claimed in claim 1, further comprising passivating the first channel if the comparing of $\gamma^*$ and $\gamma_{MON}$ finds a deviation outside a prescribed limit value.

3. The method as claimed in claim 1, further comprising performing the passivation by actuating a switch for the first channel.

4. The method as claimed in claim 1, wherein in the first channel the pseudo-control commands $\gamma_{COM}$ are determined based on at least one of pilot inputs or measurement results of sensor measurements.

5. The method as claimed in claim 1, wherein in the first channel the pseudo-control commands $\gamma_{COM}$ are generated by a first implementation of open-loop/closed-loop control laws.

6. The method as claimed in claim 1, wherein the control matrix $M \in R^{4 \times N}$ according to $\gamma = M\, u$ establishes a linear relationship with the control commands u.

7. The method as claimed in claim 5, wherein in the second channel the pseudo-control commands $\gamma_{COM}$ are generated by a second implementation of open-loop/closed-loop control laws.

8. The method as claimed in claim 7, wherein the first implementation is different from the second implementation.

9. The method as claimed in claim 1, further comprising conducting a feasibility check in addition to the comparing of $\gamma^*$ and $\gamma_{MON}$.

10. The method as claimed in claim 9, further comprising combining a result of the feasibility check and the monitoring result before passivating the first channel.

11. The method of claim 10, wherein the combining is a logical combining.

12. The method of claim 1, wherein the drive units comprise electrically driven rotors.

13. A flight control system for an aircraft with N drive units, where N is greater than 4, comprising:

a first channel configured for generating control commands $i_{COM}$, $u_{COM} \in U \subset R^N$, for the drive units, where U represents limitations of the drive units, and for transmitting the control commands to the drive units;

a second channel, which is independent of the first channel and is operatively connected to the first channel for monitoring the first channel and for delivering a monitoring result;

a passivation means configured for passivating the first channel in dependence on the monitoring result;

the first channel is also configured to generate pseudo-control commands $\gamma_{COM}$, $\gamma_{COM} \in R^4$, said pseudo-control commands specify torques about corresponding axes of rotation of the aircraft and a thrust, said torques and said thrust are adapted to be generated by the drive units, a control matrix $M \in R^{4 \times N}$ according to $\gamma = M\, u$ establishing a relationship with the control commands u and admissible control commands $u_{COM} \in U$ being calculated or determinable from the pseudo-control commands $\gamma_{COM}$ by an allocation algorithm; and the second channel is set up for monitoring the first channel, in that the second channel is configured for generating pseudo-control commands $\gamma_{MON}$, $\gamma_{MON} \in R^4$, and for evaluating the control commands $u_{COM}$ of the first channel by a relationship $\gamma^* = M\, u_{COM}$ by a comparison of $\gamma^*$ and $\gamma_{MON}$ to generate a monitoring result.

14. The flight control system as claimed in claim 13, wherein the first channel is configured for generating the pseudo-control commands $\gamma_{COM}$ by a first implementation of open-loop/closed-loop control laws and the second channel is configured for generating the pseudo-control commands $\gamma_{COM}$ by a second implementation of open-loop/closed-loop control laws.

15. The flight control system as claimed in claim 14, wherein the first implementation is different from the second implementation.

16. The flight control system as claimed in claim 13, wherein the flight control system is further configured to subject output data to a feasibility check, and the flight control system further comprises a combination means for combining a result of the feasibility check and the monitoring result before executing a passivation of the first channel.

17. The flight control system as claimed claim 13, in which the passivation means is configured as a switch.

18. The flight control system of claim 13, wherein the drive units comprise electrically driven rotors.

19. An aircraft comprising:

N drive units, where N is greater than 4;

a flight control system as claimed in claim 13; and at least one of pilot input means or sensors configured to deliver measurement results to the flight control system for generation of the pseudo-control commands $\gamma_{COM}$.

20. The aircraft of claim 19, wherein the drive units comprise electrically driven rotors.

* * * * *